(12) United States Patent
Pattok et al.

(10) Patent No.: US 11,965,572 B2
(45) Date of Patent: Apr. 23, 2024

(54) POLYGON PRISM TORSION BAR

(71) Applicant: Steering Solutions IP Holding Corporation, Saginaw, MI (US)

(72) Inventors: Eric D. Pattok, Frankenmuth, MI (US); Sai Saagar S. Adimulam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 192 days.

(21) Appl. No.: 17/226,704

(22) Filed: Apr. 9, 2021

(65) Prior Publication Data
US 2021/0317889 A1 Oct. 14, 2021

Related U.S. Application Data

(60) Provisional application No. 63/008,234, filed on Apr. 10, 2020.

(51) Int. Cl.
*F16F 1/14* (2006.01)
*B21D 28/24* (2006.01)
*B62D 1/12* (2006.01)

(52) U.S. Cl.
CPC .............. *F16F 1/14* (2013.01); *B21D 28/24* (2013.01); *B62D 1/12* (2013.01); *F16F 2226/04* (2013.01); *F16F 2238/024* (2013.01)

(58) Field of Classification Search
CPC ............ B60G 2206/20; B60G 2200/21; B60G 2206/201; B60G 2206/202; B60G 21/051; B60G 21/052; B21K 1/12; F16F 2238/024; F16F 1/14
See application file for complete search history.

(56) References Cited

U.S. PATENT DOCUMENTS

| 4,387,737 A | 6/1983 | Tobiasz |
| 4,836,516 A * | 6/1989 | Wycech ................. B60G 11/18 |
| | | 267/284 |
| 5,333,775 A * | 8/1994 | Bruggemann ....... B21D 35/006 |
| | | 228/155 |
| 5,383,811 A | 1/1995 | Campbell et al. |

(Continued)

FOREIGN PATENT DOCUMENTS

| CN | 101096213 A | 1/2008 |
| CN | 109747701 A | 5/2019 |

(Continued)

OTHER PUBLICATIONS

English translation of First Office Action regarding corresponding CN App. No. 2021103895460; dated Dec. 30, 2022.

*Primary Examiner* — Paul N Dickson
*Assistant Examiner* — Maxwell L Meshaka
(74) *Attorney, Agent, or Firm* — Dickinson Wright PLLC

(57) ABSTRACT

A torsion bar is provided that is easy, quick, and cost effective to manufacture. The torsion bar may extend along an axis and have a first end and a second end that is spaced from the first end. The torsion bar may have an active section positioned between the first and second ends. The active section may also have a length defined along the axis. A cross-section transverse to the axis may define a contour of the torsion bar where the contour may be uniform along the length of the active section. The contour may define at least one of a polygon and a polygon-like shape.

17 Claims, 3 Drawing Sheets

(56) References Cited

U.S. PATENT DOCUMENTS

| | | |
|---|---|---|
| 5,460,574 A | 10/1995 | Hobaugh |
| 5,509,324 A | 4/1996 | Cymbal |
| 11,535,079 B2 * | 12/2022 | Italiano ................ B60G 21/052 |
| 2004/0145168 A1 * | 7/2004 | Muller .................... F16F 7/125 |
| | | 280/777 |
| 2006/0230865 A1 | 10/2006 | Bolg |
| 2008/0004123 A1 | 1/2008 | Mellor |
| 2009/0126445 A1 * | 5/2009 | Liu .......................... B60D 1/58 |
| | | 164/80 |
| 2019/0277330 A1 | 9/2019 | Pattok et al. |

FOREIGN PATENT DOCUMENTS

| | | | |
|---|---|---|---|
| DE | 3624473 A1 | 1/1987 | |
| DE | 20316728 U1 * | 2/2004 | ........... B60G 11/185 |
| DE | 102016206283 A1 * | 10/2017 | |
| DE | 102017201709 A | 8/2018 | |
| JP | 2009191936 A | 8/2009 | |
| TW | 590510 U | 2/2020 | |

\* cited by examiner

POLYGON PRISM TORSION BAR

CROSS REFERENCE TO RELATED APPLICATION

This application claims the benefit of priority to U.S. Provisional Patent Application Ser. No. 63/008,234, filed Apr. 10, 2020, the disclosure of which is incorporated by reference herein in its entirety.

TECHNICAL FIELD

The subject invention relates to a torsion bar and, more particularly, to a torsion bar for a power steering assembly.

BACKGROUND

A power steering assembly of a vehicle may include a power-assisted device that facilitates the turning of a steering wheel by a vehicle operator. In order to achieve the function of the power steering assembly, it may be necessary to provide a torsion bar configured as a torsion spring with a torsional stiffness in order to facilitate the measuring of an input torque. Typically, such torsion bars have a circular cross-section profile at a mid-portion. In addition, ends of the torsion bars include serrations or a splined configured to facilitate a press-fit between the torsion bar and a mating component. However, processes required to fabricate such torsion bars to a specified rate, i.e., spring rate, and the serrated ends is expensive and time consuming. Currently, manufacture of such torsion bars includes many stages. Accordingly, it is desirable to provide a torsion bar with the desired torsional spring properties in a less expensive and time-consuming manner.

SUMMARY

According to one aspect of the disclosure, a torsion bar assembly is provided that is easy, quick, and cost effective to manufacture. The torsion bar may extend along an axis and have a first end and a second end that is spaced from the first end. The torsion bar may have an active section positioned between the first and second ends. The active section may also have a length defined along the axis. A cross-section transverse to the axis may define a contour of the torsion bar where the contour may be uniform along the length of the active section. The contour may define at least one of a polygon and a polygon-like shape.

According to another aspect of the disclosure, a vehicle steering column assembly is provided. The steering column assembly comprises a first steering column component and a second steering column component. A torsion bar may be disposed between the first steering column component and the second steering column component. The torsion bar may comprise a first end that operatively couples to the first steering column component, and a second end spaced from the first end that operatively couples to the second steering column component. The torsion bay may comprise an active section that may be positioned between and integral with the first and second ends, and the active section has a length defined along the axis. The torsion bar may have a cross-section transverse to the axis, and the cross-section may define a contour of the torsion bar. The contour is uniform along the length of the active section, and the contour is defined as of at least one of a polygon and a polygon-like shape.

According to another aspect of the disclosure, a method of forming a torsion bar assembly is provided. The method may comprise providing a stock material. The method may comprise forming a stock torsion bar with the stock material and where the stock torsion bar may have a first length and a uniform contour along the first length. The method may comprise cutting the stock torsion bar to form a torsion bar with the uniform contour and having a first end and a second end. The method may comprise forming chamfers adjacent at least one of the first end and the second end.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

DETAILED DESCRIPTION

Figure 1:
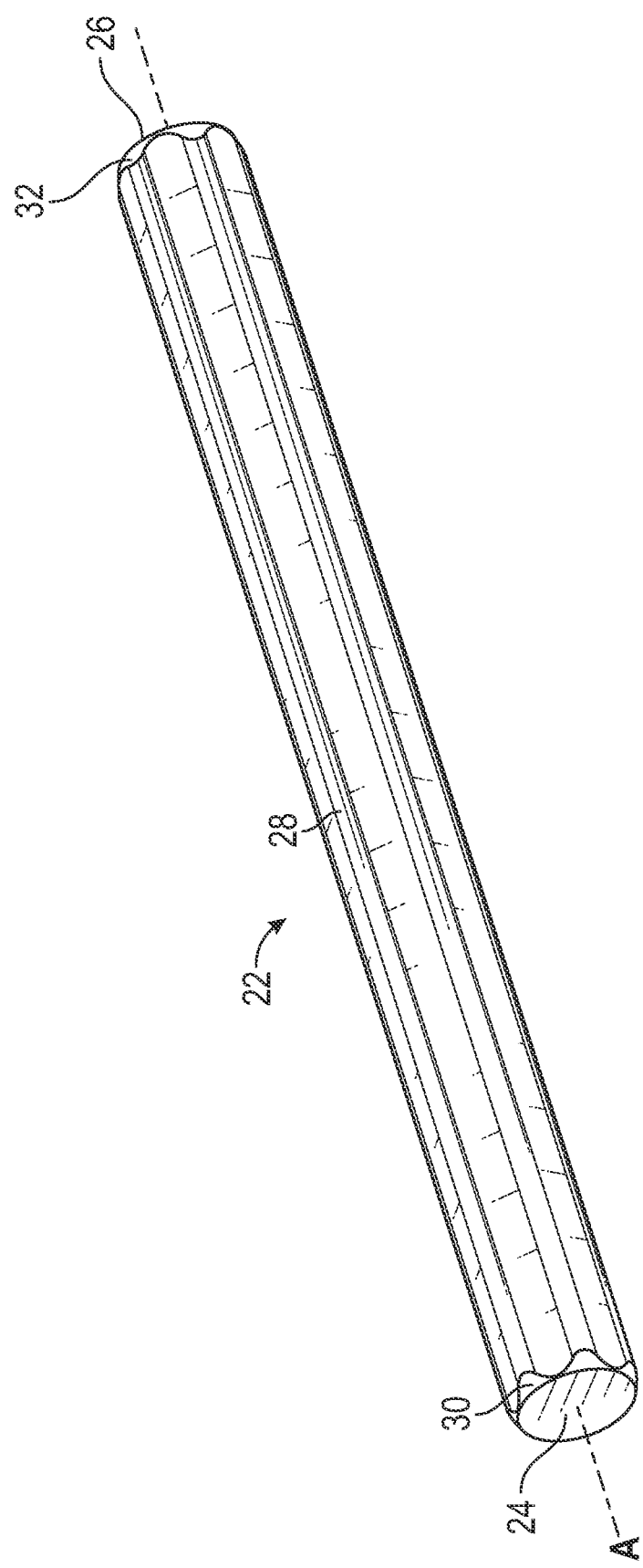
FIG. 1 is a perspective view of a torsion bar.

Referring now to the Figures, where the present disclosure will be described with reference to the specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to the FIGS., a torsion bar 22 for a steering column is illustrated. With specific reference to FIG. 1, the torsion bar 22 may be concentrically aligned with and extend along an axis A. The torsion bar 22 has a first end 24 and a second end 26 that is spaced from the first end 24. The first and second ends 24, 26 may be defined as peripheral edges or as faces of the torsion bar 22. As identified by elements 24 and 26 in the FIGS. the first and second ends are faces 24, 26. In some embodiments, the torsion bar 22 is a single, integrally formed component. For example, the torsion bar 22 may be formed from an integral stock of material that is formed through a drawing process, extrusion process, or a cold forming process. One of skill in the art may also appreciate alternative manufacturing process that are suitable for forming the torsion bar 22.

The torsion bar 22 has an active section 28. The active section 28 is positioned between the first and second ends 24, 26. The active section 28 has a length that is defined along the axis A. In some embodiments, the active section 28 comprises the entire length of torsion bar 28. In some embodiments, the active section 28 comprises a portion of the length of the torsion bar 28. The active section 28 is the portion of the torsion bar 22 that carries a torsional load and acts as a spring during operation of the steering column. For example, when implemented in the steering system the first end 24 may be received by and couple to a hand-wheel, and the second end 26 may be received by and couple to a hand-wheel actuator. In such examples, the active section 28 extends between the hand-wheel and the hand-wheel actuator and carries torsional loads to cause relative movement between the hand-wheel and the hand-wheel actuator. Moreover, the active section 28 may also act as a spring resisting relative rotation between the hand-wheel and the hand-wheel actuator.

Figure 2:
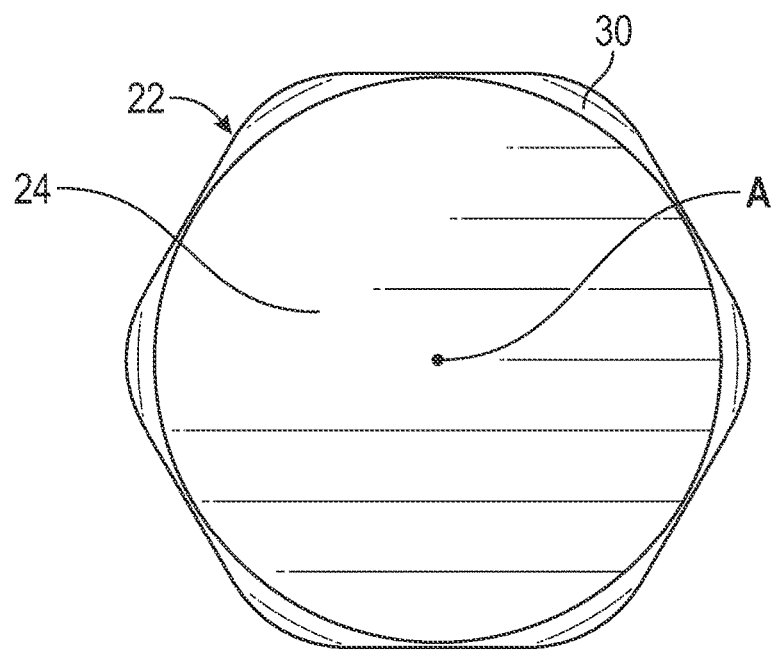
FIG. 2 is an end view of the torsion bar.
Figure 3:
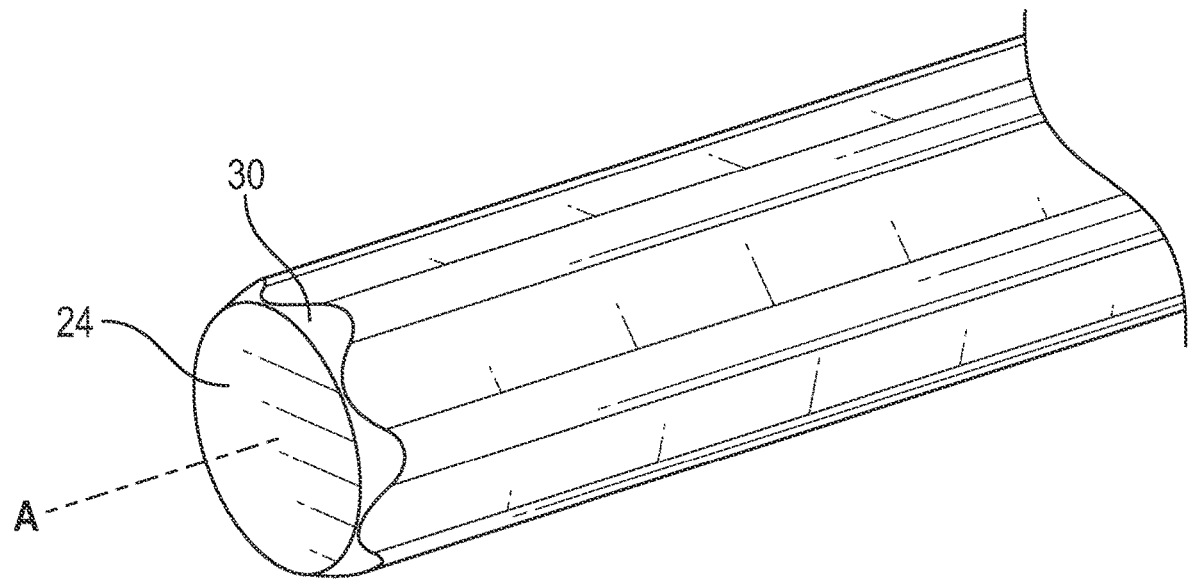
FIG. 3 is a partial perspective view of an end of the torsion bar illustrating a chamfer at the end.
Figure 4:
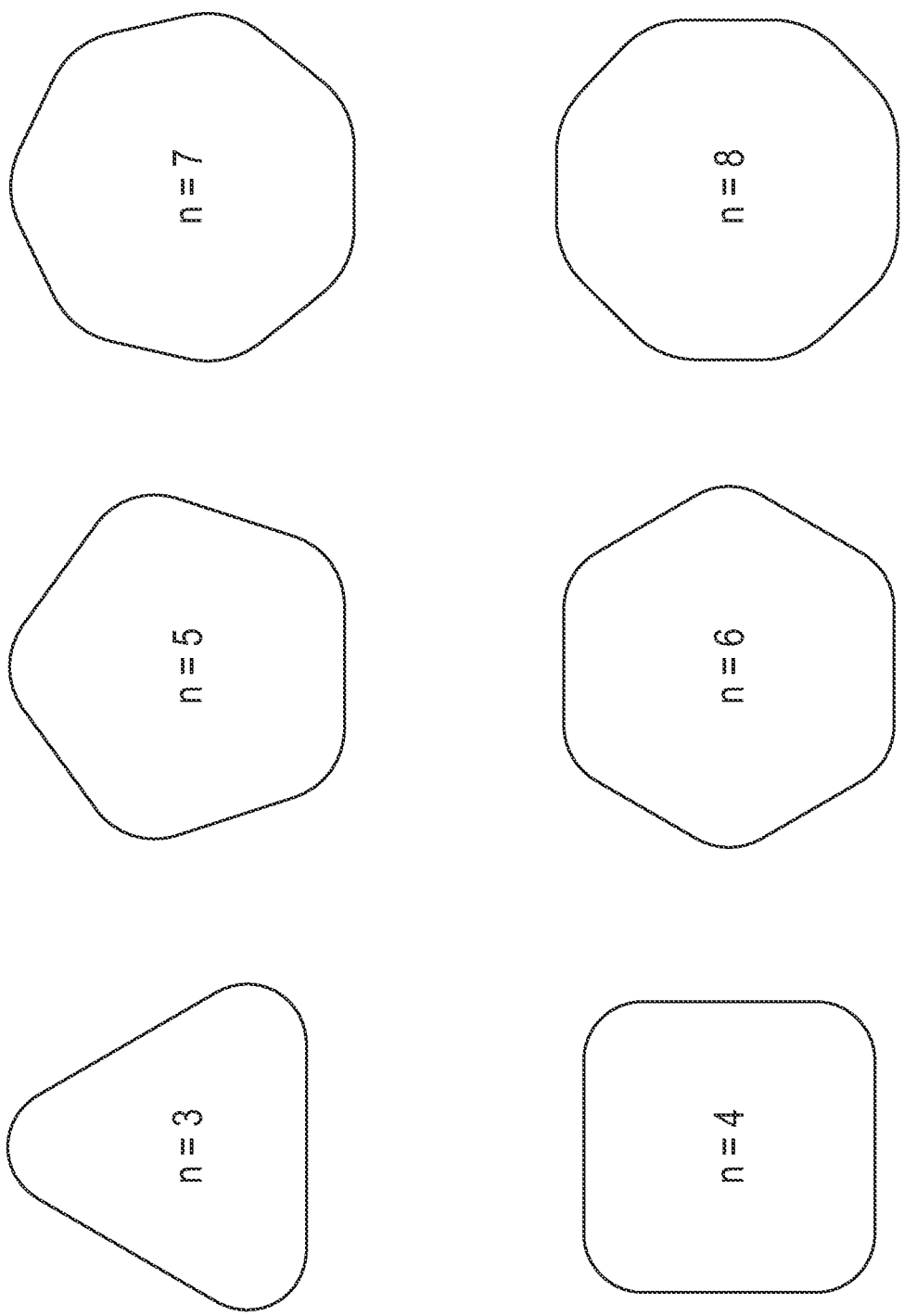
FIG. 4 illustrates various examples of cross-section profile configurations of the torsion bar.

A cross-section transverse to the axis A defines a contour of the torsion bar 22. The contour may be uniform along the length of the active section. In some embodiments, the contour may be a polygon shape. In some embodiments, the contour may be a polygon-like shape (e.g., similarly shaped as a polygon but not taking the true from of a polygon). By way of example, a polygon-like shaped contour includes rounded interfaces of the edges in some embodiments. With reference to FIGS. 2-3, and in some embodiments, the contour may have six (6) edges. With reference to FIG. 4, and in some embodiments, the contour may have any number of edges, such as the illustrated examples with three, four, five, six, seven, or eight edges. However, it is contemplated that the torsion bar 22 may be formed with a contour having even more edges than the preceding non-limiting list of examples. Regardless of the number of edges and general geometry, the torsion bar 22 has a non-circular cross-section along at least a portion of its length, where the length is measured along axis A. As shown in the illustrated embodiments, the torsion bar 22 may have a non-circular cross-section along an entire length thereof.

With reference to FIGS. 1 and 3, the torsion bar 22 may have a first end portion 30. The first end portion 30 may be spaced adjacent each of and between the first end 24 and the active section 28. The first end portion 30 may be defined as a first taper (also may be referred to herein as a chamfer or first chamfer) from the active section 28 to the first end 24. In some embodiments, the torsion bar 22 may have a second end portion 32 spaced adjacent each of and between the second end 26 and the active section 28, and the second end portion 32 may define a second taper (also may be referred to herein as a chamfer or second chamfer) from the active section 28 to the second end 26. In some embodiments, the contour and the chamfers cooperate to facilitate a force fit between the hand-wheel and one of the ends 24, 26. In some embodiments, the contour and the chamfers cooperate to facilitate a force fit with the hand-wheel actuator and the other one of the ends 24, 26. The force fit may couple the ends 24, 26 to a respective hand-wheel and hand-wheel actuator. Moreover, the ends 24, 26 may further be coupled to the hand-wheel and the hand-wheel actuator by the force fit and another mechanical means, such as screws or welding.

The present disclosure provides a method of forming the torsion bar 22 of any of the embodiments shown in FIGS. 1-4. In some embodiments, the method includes providing a stock material. The stock material may be any suitable material known in the art for use in a torsion bar. In some embodiments, the method may include forming a stock torsion bar with the stock material where the stock torsion bar has a first length and a uniform contour along the first length of the stock torsion bar. Forming the stock torsion bar may further comprise forming by an extrusion, drawing, or cold forming process. The method may further comprise cutting the stock torsion bar to form a torsion bar (e.g., the torsion bar 22 without the chamfers) with the uniform contour and having a first end and a second end (e.g., the first and second ends 24, 26). The method may also comprise forming chamfers adjacent at least one of the first end and the second end 24, 26.

In some embodiments of the method, forming the stock torsion bar may be further defined as forming through a drawing process. In some embodiments of the method, forming the stock torsion bar may be further defined as forming through an extrusion process. In some embodiments of the method, forming the stock torsion bar may be further defined as forming through a cold forming process.

In some embodiments, the method may further include washing the torsion bar. For example, after the chamfer is formed, the torsion bar 22 may be washed to remove any residual chips or dust. In some embodiments, the method may further comprise heat-treating the torsion bar 22. Heat treating may be used to increase the hardness of the torsion bar 22 to reduce hysteresis.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A torsion bar extending along an axis, the torsion bar comprising:
   a first end;
   a second end spaced from the first end;
   an active section positioned between the first and second ends, the active section having a length defined along the axis;
   a chamfer extending immediately and radially inwardly from the active section to one of the first end and the second end;
   a cross-section transverse to the axis, the cross-section defining a contour of the torsion bar where the contour is uniform along the entire length of the active section; and
   wherein the contour is defined as of at least one of a polygon and a polygon-like shape,
   wherein the torsion bar is a single, integrally formed component.

2. The torsion bar of claim 1, wherein the contour has one of three, four, five, six, seven, and eight edges.

3. The torsion bar of claim 1, wherein the torsion bar has a first end portion spaced adjacent each of, and between, the first end and the active section, and the first end portion defines a first taper from the active section to the first end.

4. The torsion bar of claim 3, wherein the torsion bar has a second end portion spaced adjacent each of, and between, the second end and the active section, and the second end portion defines a second taper from the active section to the second end.

5. The torsion bar of claim 1, wherein the polygon-like shape comprises rounded interfaces between adjacent contour edges.

6. A vehicle steering column assembly comprising:
   a first steering column component;
   a second steering column component; and a torsion bar disposed between the first steering column component and the second steering column component, the torsion bar being a single, integrally formed component comprising:
- a first end operatively coupled to the first steering column component;
- a second end spaced from the first end and operatively coupled to the second steering column component;
- an active section positioned between and integral with the first and second ends, the active section having a length defined along the axis which the torsion bar extends along;
- a chamfer extending immediately and radially inwardly from the active section to one of the first end and the second end;
- a cross-section transverse to the axis, the cross-section defining a contour of the torsion bar where the contour is uniform along the entire length of the active section; and
- wherein the contour is defined as of at least one of a polygon and a polygon-like shape.

7. The vehicle steering column assembly of claim 6, wherein the contour has one of three, four, five, six, seven, and eight edges.

8. The vehicle steering column assembly of claim 7, wherein the torsion bar has a first end portion spaced adjacent each of, and between, the first end and the active section, and the first end portion defines a first taper from the active section to the first end.

9. The vehicle steering column assembly of claim 7, wherein the torsion bar has a second end portion spaced adjacent each of, and between, the second end and the active section, and the second end portion defines a second taper from the active section to the second end.

10. The vehicle steering column assembly of claim 6, wherein the polygon-like shape comprises rounded interfaces between adjacent contour edges.

11. A method of forming a torsion bar, the method comprising:
- providing a stock material;
- forming a stock torsion bar with the stock material where the stock torsion bar has a first length and a uniform contour along the entire first length of the stock torsion bar;
- cutting the stock torsion bar to form a torsion bar with the uniform contour and having a first end and a second end; and
- forming chamfers adjacent at least one of the first end and the second end, wherein the chamfers extend immediately radially inwardly from an end of the first length to the first end and/or the second end;
- wherein the torsion bar is a single, integrally formed component.

12. The method of forming the torsion bar of claim 11, wherein forming the stock torsion bar is further defined as forming through a drawing process.

13. The method of forming the torsion bar of claim 11, wherein forming the stock torsion bar is further defined as forming through an extrusion process.

14. The method of forming the torsion bar of claim 11, wherein forming the stock torsion bar is further defined as forming through a cold forming process.

15. The method of forming the torsion bar of claim 11, further comprising one of washing and heat-treating the torsion bar.

16. The method of forming the torsion bar of claim 11, wherein the contour is defined as at least one of a polygon and a polygon-like shape.

17. The method of forming the torsion bar of claim 11, wherein the contour is defined as a polygon having six edges.

* * * * *